United States Patent Office 3,379,689
Patented Apr. 23, 1968

3,379,689
PROCESS FOR THE MANUFACTURE OF ACROLEIN POLYMERS
Sanae Tanaka, Yoshio Nakamura, and Noboru Shimazaki, Tokyo, Japan, assignors to Mitsubishi Petrochemical Company Limited, Tokyo, Japan, a corporation of Japan
No Drawing. Filed Feb. 23, 1965, Ser. No. 434,705
Claims priority, application Japan, Feb. 21, 1964, 39/9,060
9 Claims. (Cl. 260—67)

ABSTRACT OF THE DISCLOSURE

A process for the manufacture of soluble and fusible polyacrolein characterized in that acrolein is polymerized in the presence of a catalyst formed from the reaction of an organic metal compound of a metal of Groups II and III of the Periodic Table, such as zinc, cadmium and aluminium and at least one reactant selected from the group consisting of alkali metal, an alkali metal hydride such as lithium, sodium and potassium at a temperature below 0° C.

---

The present invention relates to a process for the manufacture of polyacrolein.

It has hereinbefore been known that acrolein may be naturally polymerized by an action of light or oxygen to form solid polyacrolein. It is also known that solid polyacrolein may be formed from acrolein under the action of a free radical initiator. However, these polyacroleins are practically insoluble in organic solvents and infusible because of a chemical crosslinking structure. Thus polymers of this type have not valuable industrial uses. As a process for the manufacture of polyacrolein which is soluble in organic solvents, there were Schulz's report wherein sodium-naphthalene addition product or sodium-benzophenone addition product is used as a catalyst (Makromoleculare Chemi. 60, 139 (1963)) and a patent wherein phenyl lithium or n-butyl lithium is used as a catalyst (Japanese patent publication No. 1235/63), but both report and patent use organic metal compound alone as a catalyst. In the case of the report, a polymerizing activity of catalyst is considerably decreased due to oxygen or water and thus a polymerization operation is difficult. In the case of the patent, a large amount of aldehyde groups (more than 40%) may be remained in the obtained polyacrolein and may be cross-linked in the polyacrolein molecule and thus the polyacrolein becomes insoluble.

According to our investigations it has been now found that when acrolein is polymerized by a complex compound catalyst which is obtained by a reaction of organic metal compound of metal of Groups II and III of Periodic Table and alkali metal or alkali metal hydride, a polymer which is soluble in normal organic solvents and fusible. It has also been found that this polymer has a large amount of carbon-carbon unsaturated groups which has a rich-reactivity in the molecule. Since this polymer which is obtained by the process of the present invention is still chemically active, this polymer can be added and copolymerized with other vinyl monomers such as styrene and methyl methacrylate to give a thermal plasticity and reagent resistance to these polymers of vinyl monomer for example polystyrene. As described above, since the chemical and physical properties of these known polymers can be improved by the application of functional group in the polymer according to the invention process, the usable range of the known polymers can be increased and new usability thereof can be given. These properties are the characteristics of polyacrolein which is obtained by the process of the present invention. The characteristics are based upon the facts that the polyacrolein has no cross-linking structure and has been presented a still active carbon-carbon unsaturated group. In the process of the present invention, further, a gelation is difficult to occur in the reaction compared with a process for using other organic metal compound alone and a polymer which is soluble in a variety of solvents can be obtained with a good yield.

According to the present invention, therefore, we provide a process for the manufacture of polyacrolein characterized in that acrolein is polymerized in presence of a reaction product of organic metal compounds of metal of Groups II and III of Periodic Table and at least one of alkali metal and alkali metal hydride, as a polymerization catalyst.

The organic metal compound of metal of Groups II and III of Periodic Table which is one component (A) of polymerization catalyst used in the process of the present invention is represented by the general formulas:

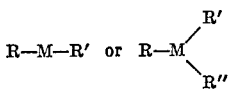

wherein M represents a metal of Groups II and III of Periodic Table such as zinc, cadmium and aluminium and R, R' and R" represent alkyl group such as methyl, ethyl, propyl, iso-propyl, n-butyl, sec.-butyl and iso-butyl, cycloalkyl groups or aryl groups, such as substituted and unsubstituted aryl. As the examples of alkali metals and their hydrides used as a second component (B) of polymerization catalyst in the process of the present invention, lithium, sodium and potassium metals and their hydrides may be mentioned.

The polymerization catalysts used in the process of the present invention can be obtained by reacting the component (A) with the component (B) in the presence of aliphatic and aromatic hydrocarbons or various ethers under a nitrogen atmosphere for from several ten minutes to several hours. Although it is not necessary to limit a ratio of component (A) to component (B), a molar ratio of component (A) to component (B) is preferable within the range of 1/100 to 100/1. The polymerization catalyst formed by the reaction of the components (A) and (B) is so-called "Art Complex" such as for example $LiZnR_3$, $LiCdR_2R'$ and $NaAlR_4$. In the polymerization reaction of the present invention, the complex compound can be used without isolating from the reaction mixture.

Although the quantity of catalyst may not be limited, it is normally preferable to use the catalyst in an amount of 0.001 to 10 mol. percent, especially 0.01 to 5 mol. percent per mol. of monomer. The polymerization method is not particularly limited, but the polymerization is preferably carried out in a solvent which is inert for both acrolein and catalyst because both acrolein and catalyst have high reactivities. The polymerization temperature is a very important factor in order to obtain the polymer which has the hereinbefore mentioned properties, and thus should be lower than 0° C. Especially preferable temperature is from —70° to —20° C. Because the rate of polymerization is too slow at a lower temperature and on the other hand, the regulation of polymerization reaction is difficult and the formation of insoluble and infusible polymer is increased at a higher temperature.

As the solvent for polymerization reaction, it is possible to use all inert solvents against both acrolein and catalyst. In them, polar solvents, especially ethers, such as, for example, tetrahydrofuran and ethylene glycol dimethyl ether and nitrogen containing compound such as acetonitrile, N,N′-dimethyl formamide and pyridine give superior result. It is also possible to use aromatic, aliphatic and alicyclic hydrocarbons such as toluene, heptane and cyclohexane. The concentration of acrolein in the polymerization may be maintained at a quantity of 1 to 200% by weight of solvent which is used, but the preferable concentration of acrolein is 20 to 100% by weight of solvent.

It is assumed that according to the process of the present invention the polymerization is based upon more than 90% of carbonyl group of acrolein monomer and is merely based upon less than 10% of vinyl group, judging from the measurement of contents of unreacted carbon-carbon unsaturated group and aldehyde group. Therefore, the main chain of the polymer obtained by the invention process is constituted of an ether bonding.

It is further assumed from the result of measurement of infrared absorption spectrum for polymer that the polymer contains also 1.4-addition polymerization type which is $-(CH_2-CH=CH-O-)_n$. And further, the polymer is a typical high molecule judging from the result for the polymer of measurement of molecular weight in ebulliometer and the molecular weight of it is 3,000 to 10,000.

The present invention is illustrated but not limited by the following examples in which the selectivity of polymerization due to carbonyl group was calculated from the following formula:

$$\frac{D_{7.00\mu}}{D_{7.00\mu}+D_{5.82\mu}} \times 100\%$$

wherein $D_{7.00\mu}$ is absorbance of vinyl group and $D_{5.82\mu}$ is an absorbance of aldehyde group in infrared absorption spectrum, respectively.

EXAMPLE 1

Preparation of catalyst 1.15 g. (0.05 mol.) of sodium metal, 10 cc. (0.07 mol.) of triethylaluminium and 20 cc. of toluene were heated at the temperature of 100° C. on an oil bath for two hours in a stream of nitrogen with agitation. The sodium metal was gradually dissolved into the reaction solution to precipitate aluminium powder. The supernatant liquid of the reaction mixture was used as a catalyst.

Polymerization 30 cc. of a purified tetrahydrofuran and 0.06 cc. of the above catalyst were charged into a vessel which was sufficiently purged with nitrogen and then the content was cooled to the temperature of −40° C. and thereafter 10 cc. of acrolein (which was dehydrated with calcium hydride after the rectification and then purified by distillation just before a polymerization, and which had a purity of 99.0%) was poured into the vessel and further was agitated for three hours at that temperature to give a viscous solution. The viscous solution was charged with 200 cc. of heptane containing hydrochloric acid to obtain a white snowlike polymer. The separated polymer was dried at a normal temperature under a reduced pressure for twenty-four hours to obtain 8.5 g. of white powdery polymer. This polymer was insoluble in aliphatic hydrocarbon, but was soluble in aromatic hydrocarbon, such as benzene and toluene, oxygen containing compound such as acetone and dioxane, nitrogen containing compound such as N,N′-dimethylformamide and pyridine and other many solvents which were generally used. The melting point of the polymer was 100° to 110° C. and the molecular weight about 8,000. The selectivity of polymerization due to carbonyl radical was 99.6%. According to the result of measurement of infrared absorption spectrum in KBr method, there were shown each absorption of 7.00μ, 10.20μ, 10.75μ and 14.2μ depended upon C=C bond, each absorption of 3.65μ and 5.82μ depended upon aldehyde radical and each absorption of 7.84μ and 8.12μ depended upon —C=C—O—C— bond.

Although it is considered that the polymer is consisted of the following structure units (I), (II) and (III)

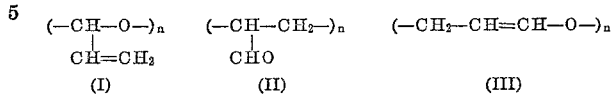

it is assumed that the polymer is mainly constituted of the structure unit (I) judging from the selectivity of polymerization.

EXAMPLE 2

Preparation of catalyst 2.4 g. (0.05 mol.) of oily sodium hydride of concentration of 50%, 8.3 cc. (0.08 mol.) of diethyl zinc and 20 cc. of toluene were heated under reflux at the temperature of 120° C. on an oil bath in a nitrogen stream for one hour with agitation. The supernatant liquid of the reaction mixture was used as a catalyst.

Polymerization 40 cc. of tetrahydrofuran and 0.6 cc. of the above catalyst were charged into a vessel which was purged with nitrogen, and then the content was cooled to the temperature of −20° C., and therefore, 10 cc. of acrolein purified as described in Example 1 was poured into the vessel and further was agitated for three hours at that temperature. The obtained reaction product was treated as described in Example 1 to obtain 8.4 g. of white powdery polymer. The polymer showed a solubilizing property similar to that of the polymer obtained in Example 1. The melting point of the polymer was 95° to 100° C. and the molecular weight about 5,000. The selectivity of polymerization due to carbonyl radical was 99.3%.

EXAMPLE 3

Preparation of catalyst 0.34 g. (0.05 mol.) of lithium metal, 9.1 cc. (0.07 mol.) of triethyl aluminium and 20 cc. of toluene were heated under reflux at the temperature of 120° C. on an oil bath in a nitrogen stream for two hours with agitation. Lithium metal was gradually dissolved into the reaction solution to precipitate aluminium powder. The supernantant liquid of the reaction mxture was used as a catalyst.

Polymerization 40 cc. of tetrahydrofuran and 0.6 cc. of the above catalyst were charged into a vessel which was purged with nitrogen, and then the content was cooled to the temperature of −20° C. Thereafter, 10 cc. of acrolein purified as described in Example 1 was poured into the vessel and further was agitated for three hours at that temperature. The obtained reaction product was treated as described in Example 1 to obtain 8.5 g. of a white powdery polymer. The polymer showed a solubility similar to that of the polymer obtained in Example 1. The melting point of the polymer was 95° to 100° C. and the molecular weight about 6,500. The selectivity of polymerization due to carbonyl radical was 99.2%.

What we claim is:
1. A process for the manufacture of soluble and fusible polyacrolein characterized in that acrolein is polymerized in presence of a catalyst formed from the reaction of organic metal compound of metal of Groups II and III of Periodic Table wherein said organic radical is selected from the group consisting of alkyl, cycloalkyl and aryl and at least one reactant selected from the group consisting of alkali metal and alkali metal hydride at a temperature below 0° C.

2. A process according to claim 6, wherein the polymerization temperature is −20 to −70° C.

3. A process according to claim 6 wherein said catalyst is a reaction product of sodium metal and triethyl aluminium.

4. A process according to claim 6 wherein said catalyst is a reaction product of sodium hydride and diethyl zinc.

5. A process according to claim 6 wherein said catalyst is a reaction product of lithium metal and triethyl aluminium.

6. The process of claim 1 wherein the metal forming said organic metal compound is selected from the group consisting of zinc, cadmium and aluminium.

7. The process of claim 6 wherein said catalyst is formed under a nitrogen atmosphere.

8. The process of claim 6 wherein said catalyst is present in the amount between .001 and 10 mol percent.

9. The process of claim 6 wherein said catalyst is formed at a temperature of 100–120° C.

References Cited

FOREIGN PATENTS 1,296,464  5/1962  France.

WILLIAM H. SHORT, *Primary Examiner.*

S. H. BLEACH, *Examiner.*

L. M. PHYNES, *Assistant Examiner.*